United States Patent Office 2,805,241
Patented Sept. 3, 1957

2,805,241
PROCESS FOR THE MANUFACTURE OF ORGANIC COMPOUNDS CONTAINING SULFUR AND PHOSPHORUS

Richard Sallmann, Binningen, Switzerland, assignor to Ciba Limited, Basel, Switzerland, a Swiss firm No Drawing. Application June 11, 1956,
Serial No. 590,347

Claims priority, application Switzerland June 22, 1955

3 Claims. (Cl. 260—461)

It is known that dialkyl-thiophosphites such, for example, as diethyl-thiophosphite of the formula

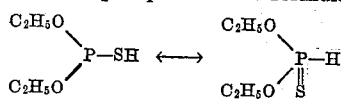

can be obtained by heating a phosphorus polysulfide with an alcohol.

The yields of dialkyl-thiophosphite are unsatisfactory, as the main products formed are dialkyl-di-thio-phosphoric acids and dialkyl-dithiophosphoric acid alkyl esters, so that the process is not commercially suitable for the manufacture of dialkyl-thiophosphites.

The present invention is based on the observation that esters of thiophosphorous acid of the general formula

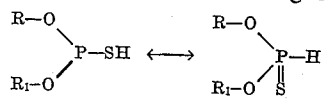

in which R and $R_1$ each represents any desired organic radical, can be obtained in a simple manner by reacting a compound of the general formula

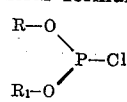

in which R and $R_1$ have the meaning given above, with hydrogen sulfide in the presence of an agent capable of binding hydrogen halide.

The symbols R and $R_1$ in the above formulae may represent aliphatic radicals and these radicals may have straight or branched chains and may be saturated or unsaturated, and they may be unsubstituted or may contain substituents. There may be mentioned, for example, methyl, ethyl, propyl, isopropyl, butyl, hexyl, 2-ethyl-butyl, octyl, 2-butyl-octyl, dodecyl, octadecyl, allyl and 2-chlorethyl groups; and also radicals containing thiocyano, cyano or ester groups. Alternatively, R and $R_1$ may represent aromatic radicals, which may be mononuclear or polynuclear and may contain nuclear substituents. There may be mentioned, for example, phenyl, 2- or 4-chlorophenyl, 2:4-dichlorophenyl, 4-methoxyphenyl, 4-nitrophenyl, naphthyl and 4-diphenyl groups. R and $R_1$ may also represent araliphatic radicals, for example, the benzyl group, or cycloaliphatic radicals, for example, the cyclohexyl group, or they may be heterocyclic radicals, for example, the tetrahydrofurfuryl radical. There are advantageously used dialkyl chlorophosphites, especially diethyl chlorophosphite.

As agents capable of binding hydrogen halide there are used more especially tertiary bases, such as dimethylaniline, triethylamine or pyridine.

The reaction is advantageously carried out at room temperature or a moderately raised temperature and in an inert diluent. As such diluents there may be used, for example, hydrocarbons such as benzene, toluene and the like, chlorobenzene etc., or ketones, such as acetone, methyl ethyl ketone or methyl propyl ketone, or ethers such as diethyl ether, or tetrahydrofurane.

Some of the esters of thiophosphorous acid obtainable by the process of the invention are known and others are new. They are valuable intermediate products for the synthesis of phosphorus compounds suitable for combating pests. Thus, by additive combination with sulfur they yield dithiophosphoric acid esters of the general formula

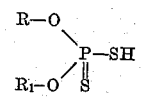

in which R and $R_1$ have the meaning given above. These esters are, in turn, useful as starting materials, for example, for the production of maleic acid-ester addition products. By reacting esters of thiophosphorous acid with chlorine there are obtained compounds of the general formula

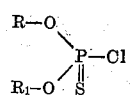

in which R and $R_1$ have the meaning given above. Compounds of this kind, when reacted with phenols or enols in known manner yield valuable insecticides.

The following examples illustrate the invention, the parts being by weight unless otherwise stated and the relationship of parts by weight to parts by volume being the same as that of the kilogram to the liter:

Example 1

15.7 parts of diethyl-chlorophosphite and 8 parts of pyridine are dissolved in 100 parts of ether and hydrogen sulfide is introduced, while stirring, and care is taken by cooling that the temperature does not rise too strongly. When hydrogen sulfide escapes from the liquid and the temperature rises no further, the precipitated pyridine hydrochloride is filtered off and the ether is evaporated from the filtrate. By distilling the residue there is obtained a yield of over 80 percent diethyl-thiophosphite in the form of a colorless oil boiling at 68–70° C. under 12 mm. pressure. Instead of pyridine, there may be used an equivalent quantity of another tertiary base, for example, dimethylaniline or triethylamine.

Example 2

Chlorine is introduced at −10 to 0° C. into 15.4 parts of diethyl-phosphite until saturation point is reached. By subsequent distillation diethyl-thiophosphoric acid chloride is obtained in a yield exceeding 90 percent.

Example 3

4.8 parts of sulfur are suspended in a solution of 23 parts of diethyl-thiophosphite in 30 parts of alcohol. Ammonia is introduced, while stirring, whereupon the temperature rises spontaneously and is maintained by cooling at 30–50° C. The sulfur slowly dissolves. When the temperature begins to fall, the mixture is heated for a short time at 40–50° C. There is obtained a clear colorless solution of the ammonium salt of diethyl-dithio-phosphoric acid, which can be used directly for further treatment after evaporating the solution or driving off the excess of ammonia.

Example 4

A solution of 23 parts of absolute alcohol and 29.5 parts of pyridine is added dropwise to a solution of 73 parts of ethyldichloro-phosphite in 600 parts of absolute ether at 0° C., while stirring and introducing nitrogen. When the addition is complete, the mixture is stirred for a further hour at room temperature. 39.5 parts of pyridine are then added at 0–10° C. while stirring, and then hydrogen sulfide is introduced at the same temperature until it ceases to be absorbed and the reaction has become neutral. The duration of the introduction of hydrogen sulfide is about 1½ hours. The mixture is filtered, the residue is washed with ether, the ether is distilled off, and the residue is distilled. In this manner there are obtained 47 parts of diethyl-thiophosphite boiling at 70° C. under 12 mm. pressure, the yield corresponding to 61 percent.

*Example 5*

79 parts of pyridine are added, while stirring, to a solution of 128 parts of dimethylchlorophosphite in 1200 parts by volume of absolute ether at 0–10° C. Dried hydrogen sulfide is then introduced at the same temperature until the reaction ceases. After filtering off and washing the pyridine hydrochloride with ether, there are obtained, after distilling off the ether, 93.4 parts of a residue. The dimethyl thiophosphite distils at 52–54° C. under 12 mm. pressure.

Methyl dodecyl chlorophosphite can be reacted in the same manner, instead of dimethyl chlorophosphite.

*Example 6*

44 parts of ethyl cyclohexyl chlorophosphite boiling at 106–107° C. under 12 mm. pressure are diluted with 250 parts by volume of absolute ether. After the addition of 17.6 parts of pyridine while cooling, hydrogen sulfide is introduced at 20–30° C. while stirring until pyridine hydrochloride ceases to separate out and the mixture has become neutral. The pyridine hydrochloride is then filtered off and the ether is distilled. 35 parts of a residue are obtained. The resulting ethyl cyclohexyl thiophosphite boils at 72–73° C. under 0.08 mm. pressure.

*Example 7*

16 parts of pyridine are slowly added, while stirring, to a solution of 43.6 parts of benzyl ethyl chlorophosphite in 300 parts by volume of absolute ether at 0–10° C. Hydrogen sulfide is then introduced at 10–20° C. until the precipitation of pyridine hydrochloride ceases and the reaction becomes neutral. After filtering and washing the filter residue, there are obtained, after distilling off the ether, 44.6 parts of a colorless oil which is soluble in organic solvents. If it is attempted to distil this oil decomposition occurs accompanied by the separation of a yellow-brown solid substance.

In the same manner there can be prepared phenylethyl thiophosphite, tetrahydrofurfuryl ethyl thiophosphite and ethyl ethylthioethylthiophosphite. These products are also non-distillable.

What is claimed is:

1. A process for the manufacture of a thiophosphorus acid ester of the general formula

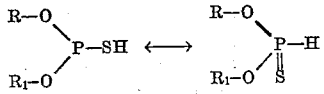

wherein R and $R_1$ each represents an organic radical selected from the group consisting of alkyl, cyclohexyl, benzyl, phenyl, lower alkyl-thio-lower alkyl and tetrahydrofurfuryl radicals, which comprises reacting a compound of the general formula

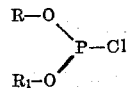

wherein R and $R_1$ have the meanings given above, with hydrogen sulfide in the presence of a hydrogen halide binding agent.

2. A process for the manufacture of a thiophosphorous acid ester of the general formula

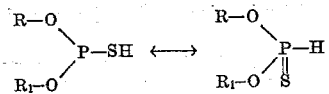

wherein R and $R_1$ each represents an alkyl radical containing 1–4 carbon atoms, which comprises reacting a compound of the general formula

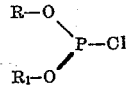

wherein R and $R_1$ have the meanings given above, with hydrogen sulfide in the presence of a hydrogen halide binding agent.

3. A process for the manufacture of diethyl-thiophosphite, which comprises reacting diethyl chlorophosphite with hydrogen sulfide in the presence of pyridine.

References Cited in the file of this patent
UNITED STATES PATENTS

| | | |
|---|---|---|
| 2,523,147 | Dean et al. | Sept. 19, 1950 |
| 2,689,258 | McDermott | Sept. 14, 1954 |